United States Patent [19]

Conly et al.

[11] Patent Number: 4,533,967
[45] Date of Patent: Aug. 6, 1985

[54] MULTIPLE LEG MULTICHANNEL MAGNETIC TRANSDUCER STRUCTURE AND METHOD OF MANUFACTURING

[75] Inventors: Ralph A. Conly, Sunnyvale; Stanley M. Latimer, San Jose, both of Calif.

[73] Assignee: Ampex Corporation, Redwood City, Calif.

[21] Appl. No.: 436,084

[22] Filed: Oct. 22, 1982

[51] Int. Cl.³ .............................................. G11B 5/20
[52] U.S. Cl. .................................. 360/123; 360/125; 29/603
[58] Field of Search ............... 360/121, 123, 125–126, 360/129; 29/603

[56] References Cited

U.S. PATENT DOCUMENTS

| | | | |
|---|---|---|---|
| 3,672,044 | 6/1972 | Tanaka et al. | 360/121 X |
| 3,761,641 | 9/1973 | Mlinaric | 360/121 |
| 3,881,194 | 4/1975 | Heaslett et al. | 360/123 |
| 3,964,103 | 6/1976 | Thompson et al. | 360/129 |
| 4,293,884 | 10/1981 | Schiller | 360/125 X |

Primary Examiner—John H. Wolff
Attorney, Agent, or Firm—Elizabeth E. Strnad; Joel D. Talcott

[57] ABSTRACT

In the preferred embodiment of the high density multichannel transducer each channel has two assembled corresponding magnetic core portions, each portion having an intermediate and a rear leg portion, respectively. Both core portions are contiguous with a magnetic pole and each provides a separate flux path. The rear leg portion extends at an acute angle to the intermediate leg portion and it converges towards the transducing gap plane. A recording coil is placed on the intermediate leg portion. The angle of the rear leg portion is selected such that sufficient clearance is provided from the intermediate leg portion to allow winding the reproducing coil directly around the rear leg portion. Interchannel crosstalk is reduced and mechanical damage to the reproducing coil is eliminated.

22 Claims, 7 Drawing Figures

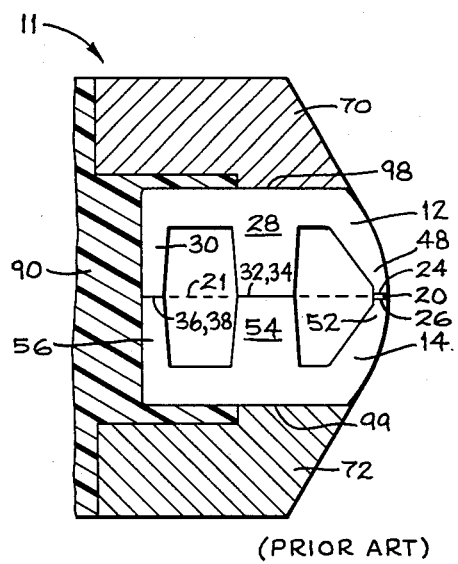
FIG_1 (PRIOR ART)
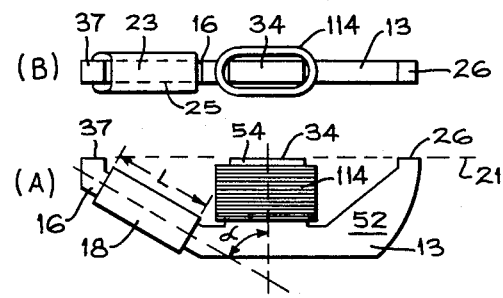
FIG_2
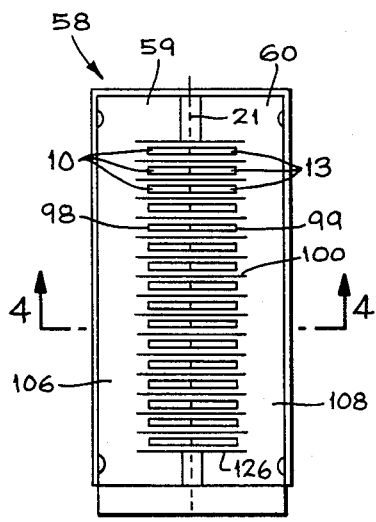
FIG_3
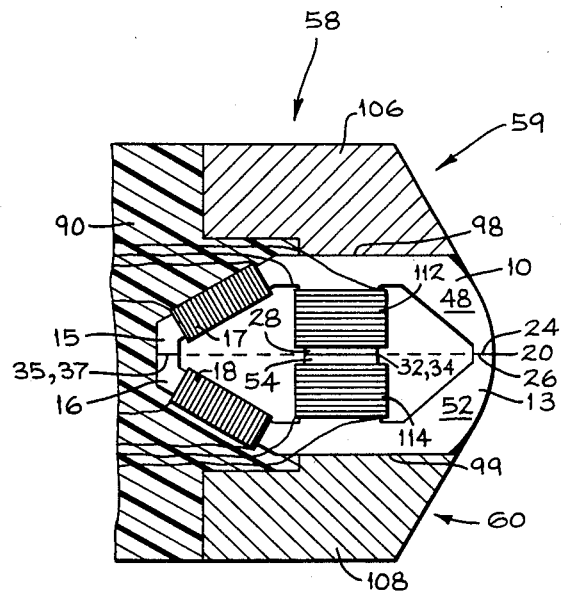
FIG_4

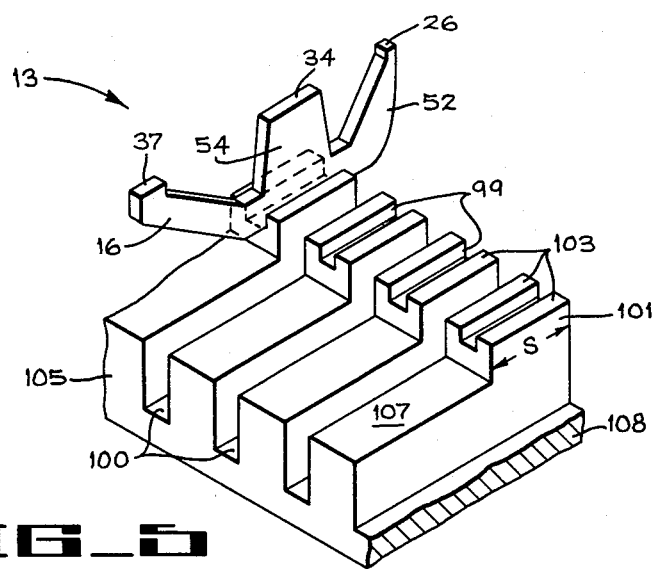
FIG_5
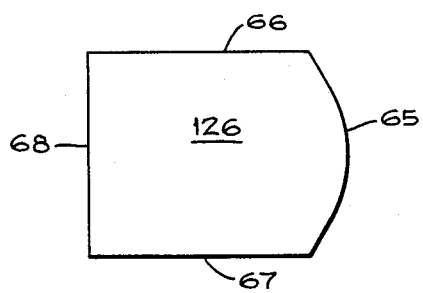
FIG_6
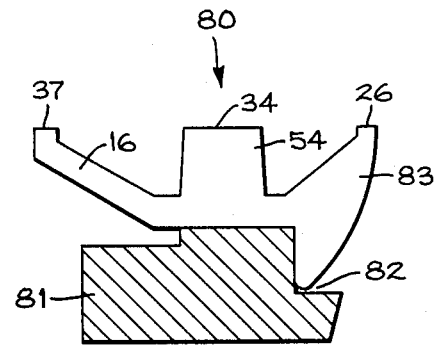
FIG_7

MULTIPLE LEG MULTICHANNEL MAGNETIC TRANSDUCER STRUCTURE AND METHOD OF MANUFACTURING

BACKGROUND OF THE INVENTION

The invention relates to an improved multichannel magnetic transducer structure having a multiple leg back core and to a method of making the improved transducer structure. More particularly, the invention relates to an improvement in the rear leg of the multiple leg core structure and in the associated transducing windings, respectively.

Multiple leg magnetic transducers are known, for example, from the U.S. Pat. Nos. 3,881,194 and 4,293,884 both assigned to Ampex Corporation, assignee of this patent application, which patents are hereby incorporated by reference.

The U.S. Pat. No. 3,881,194 describes a multiple leg magnetic transducer having back core legs contiguous with the pole pieces and each leg defining a separate flux path. A transducer with two legs is described, one leg carrying a low impedance record winding and the other leg a high impedance playback winding, also referred to as reproduce winding. The transducer operates in either recording or reproducing mode. The switching between modes is accomplished by electromagnetically blocking that leg which is not used in a particular mode so that no appreciable magnetic signal flux passes through that leg.

The U.S. Pat. No. 4,293,884 describes a multiple leg magnetic transducer of the type described in U.S. Pat. No. 3,881,194. More particularly a transducer structure is described whose back core has an intermediate leg and a rear leg extending substantially in parallel with the intermediate leg. Both legs are contiguous with the pole pieces and each leg defines a separate magnetic flux path. A recording coil is placed on the intermediate leg while a reproducing coil is placed on the rear leg. Depending on the particular operation mode one of these legs is electromagnetically gated to prevent passage of magnetic flux therethrough while the other leg is in operation.

The U.S. Pat. No. 4,293,884 further discloses a particular structure for supporting the multiple leg transducer to eliminate undesirable spacing between the corresponding intermediate and rear leg portions, respectively. A simplified cross sectional view of that prior art transducer is shown in FIG. 1 of the attached drawings and will be briefly discussed below. The transducer 11 of FIG. 1 has two corresponding core portions 12, 14 supported by side pieces 70, 72, respectively. A transducing gap 20 is formed between abutting end faces 24, 26 of corresponding magnetic poles 48, 52. The core portions 12, 14 are assembled with corresponding poles 48, 52 and leg portions 28, 54; 30, 56 in registration and with corresponding end faces 24, 26; 32, 34 and 36, 38 abutting. The thusly assembled core portions and side pieces are bonded together under pressure by a suitable bonding material 90 in a known manner. It is noted that showing of the bonding material 90 is deleted from inner spaces between the core portions for better clarity of representation. The U.S. Pat. No. 4,293,884 further describes recording coils placed on intermediate legs 28, 54 and reproducing coils on rear legs 30, 56 (coils are not shown in FIG. 1). The transducing coils are first prewound away from the core and subsequently inserted on the core prior to assembling the corresponding core portions together. These coils are prewound on a self-supporting insulating bobbin whose perimeter is larger than that of the underlying core to facilitate transfer on the core. For the latter reason the coil receiving cores are known to be tapered as it is shown in FIG. 1. Consequently, the prewound coils inherently occupy excessive space thereby reducing the number of windings which can be accomodated due to limited lateral space between adjacent channels. The magnetic coupling between the coil and associated core portion is substantially reduced due to the loose fit of the coil, thus producing undesirable leakage flux.

When utilizing the known multichannel multiple leg transducers such as described in the U.S. Pat. No. 4,293,884, in high density recording and reproducing applications having closely spaced adjacent channels, undesirable channel-to-channel crosstalk may result between adjacent channels. In certain applications, for example when one channel of the multichannel transducer is in the recording mode and an immediately adjacent closely spaced channel is in the reproducing mode, a substantial amount of leakage flux from the recording coil may be induced in the reproducing coil of the adjacent channel. In some applications such as professional audio recording and reproduction the above-indicated crosstalk may exceed acceptable limits.

Further shortcomings of the above-indicated prior art multichannel multileg transducers are that when utilized for high channel densities it has been a known practice to mechanically compress the prewound coils after placing them on the core to reduce their size in the channel-to-channel direction. Applying mechanical force to the coils in the above manner often resulted in damaging the small diameter wire which thus became interrupted or alternatively grounded or a number of windings became shorted within the coil. A high rejection rate resulted.

SUMMARY OF THE INVENTION

Consequently it is an object of the invention to provide an improved multiple leg multichannel magnetic transducer having closely spaced channels in which the above-indicated disadvantages are eliminated.

It is a further object of the invention to provide a multiple leg multichannel transducer having closely spaced channels in which the channel-to-channel cross talk is reduced.

It is still another object of the invention to provide a multiple leg multichannel transducer having closely spaced transducing channels in which mechanical damage to the transducing coils is eliminated.

It is a further object of the invention to provide a method for manufacturing a magnetic transducer having the above-indicated features.

The foregoing and other objects, features and advantages of the invention will become apparent from the following description and accompanying drawings.

BRIEF DESCRIPTION OF THE DRAWINGS

FIG. 1 is simplified cross-sectional view of a prior art multiple leg magnetic transducer;

FIGS. 2A and 2B respectively show a top and side view of a magnetic core portion with transducing coils in accordance with the invention;

FIG. 3 is a front elevation view of a multichannel magnetic transducer assembly in accordance with the invention;

FIG. 4. is a cross-sectional view of the multichannel transducer assembly of FIG. 3 taken along line 4—4 thereof, turned by 90 degrees;

FIG. 5 is a fragmentary perspective view schematically representing a portion of a side piece with grooves for supporting magnetic cores and shields;

FIG. 6 is a side view of an interchannel shield utilized in the assembly of FIG. 3, and FIG. 7 is a cross-sectional view of a side piece having inserted therein a magnetic core portion of an alternative design in accordance with the invention.

DETAILED DESCRIPTION

The preferred embodiment of the invention will be described now with reference to FIGS. 2 to 6. To facilitate comparison similar elements shown in the various drawing figures will be designated by like reference numerals.

FIGS. 2A and 2B respectively show a top and a side view of a magnetic core portion in accordance with the invention. Core portion 13 comprises a magnetic pole 52 and an intermediate leg portion 54 contiguous therewith. Elements 52 and 54 are similar to those of the above described core portion 14 of FIG. 1. The rear leg portion 16 which is also contiguous with the respective elements 52, 54 is different from FIG. 1 as follows. The rear leg portion 16 of FIG. 2 extends at an acute angle α with respect to the intermediate leg portion 54. The angled rear leg portion converges toward the transducing gap plane as it will follow from further description. Angle α is selected as a compromise between a desired extended length L of a coil receiving section 23 and a desired short flux path formed by the rear leg portions to reduce magnetic reluctance and thus increase efficiency. In addition, in the preferred embodiment angle α is selected to obtain sufficient clearance between an inner end of coil 18 adjacent to intermediate leg portion 54 and the end face 34, respectively, to facilitate winding of coil 18 directly on the rear leg portion 16 as it will follow from further description.

A sufficiently flexible magnetic material, also referred to as being generally flexible, is utilized for the core portion 13 since extremely hard and brittle materials may easily crack under the pressure applied during manufacturing and operation, as it will follow from further description. The magnetic core portion 13 is made preferably of a laminated material, for example etched or stamped of HY-MU 80 to obtain 1 to 6 mil thick laminations as it is well known in the art. The latter magnetic material has been selected with respect to its flexibility and high permeability features. The obtained laminations are then superposed and bonded with a suitable adhesive to obtain the laminated core portion 13 of a width corresponding to a desired recording/reproducing track width, as it is well known.

As it is shown in FIGS. 2A and 2B, the intermediate leg portion 54 receives a first transducing coil 114 which in the preferred embodiment is a recording coil. Coil 114 may be first prewound for example on a mandrel and thereafter transferred to leg portion 54 in a manner well known in the art. A second coil 18 which in the preferred embodiment of the invention is a reproducing coil is wound directly around the rear leg portion 16 prior to placing coil 114 on leg portion 54 as follows. First a thin layer 25 of insulating material, for example mylar adhesive tape, is placed directly on the core receiving section 23 of the rear leg portion 16. As well known the insulating layer 25 is utilized to electrically insulate the coil from the immediately underlying portion 23 of the magnetic core 13. Thereafter the transducing coil 18 is tightly wound around section 23 of the rear leg portion 16, directly on top of the insulating layer 25. Because of the improvement related to the angled back core structure of FIG. 2, winding of the coil 18 directly on the coil receiving section 23 is facilitated. For example, a commercially available coil winder may be utilized for winding coil 18, such as ACCU-WINDER, type ACW-13D, manufactured by ACCU-WINDER Manufacturing Company. Particularly, when coil 18 is utilized as a reproduce coil the desired number of turns of a relatively small diameter wire may be significantly increased while a snuggly fitting coil is provided with respect to the underlying core portion. Thus the magnetic coupling between the coil 18 and core 16 is significantly improved and the leakage flux substantially reduced which in turn results in interchannel cross talk reduction. At the same time the space which the coil would otherwise take up in the channel-to-channel direction is significantly reduced thus obviating the need of mechanically squeezing and thereby damaging the coils as it has been previously mentioned with respect to prior art transducers.

The foregoing features of the present invention allow to provide an approximately 20% to 25% increase in the number of turns of coil 18.

Now a preferred embodiment of a multichannel transducer assembly in accordance with the invention will be described with reference to FIGS. 3 to 6, such as utilized in longitudinal tape recorders. The multichannel transducer assembly 58 comprises two corresponding half assemblies 59, 60 abutting at a transducing gap plane 21, as shown in FIG. 3. Each half assembly comprises a side piece 106, 108 made preferably of a readily machinable, nonmagnetic material, such as aluminum or brass. The latter materials have an additional advantage of excellent electric shielding properties as is well known in the art. The side pieces 106, 108 which serve as core and shield holders, respectively, each have a plurality of corresponding shield slots 100 formed therein, as well known in the art. A plurality of corresponding magnetic core portions 10, 13 with transducing windings 17, 18, 112, 114 thereon, as best shown in FIG. 4, are secured in the core slots 98, 99. Shield slots 100 serve to accommodate electromagnetic shields 126 as shown in FIG. 3 and 6, however, not shown in FIG. 5 for better clarity. The shields 126 are arranged between adjacent cores and spaced apart therefrom.

The side pieces 106, 108 are formed preferably of readily machinable non-magnetic material, such as aluminum or brass. Precisely matched grooves 98, 99 are machined in the corresponding side pieces 106, 108 respectively, for receiving core portions 10, 13. The core portions 10, 13 are fixedly mounted in the corresponding grooves in precise registration, for example, by epoxy or glass bonding, as well known.

The magnetic core portions 10 correspond to the previously described core portions 13 shown in FIG. 2; therefore, they will not be described here to avoid repetition.

Since in the preferred embodiment of the invention both side pieces 106, 108 of the multichannel transducer structure 58 are of similar design, only one side piece 108 is shown in FIG. 5. As it is seen from FIG. 5, side piece 108 has a first part 101 having a width S supporting both the pole 52 and contiguous intermediate leg portion 54 of each magnetic core portion 13 of the multichannel structure. Previously mentioned longitudinal parallel grooves 99 are machined into the first portion 101, to form core slots extending inwardly from a planar surface 103. A planar surface 107 parallel with planar surface 103 is recessed with respect there to allow flexing of the unsupported rear leg portion 16 as it is known from the U.S. Pat. No. 4,293,884. The surfaces 103, 107 are substantially parallel with the transducing gap plane 21 of the multichannel transducer assembly, formed by the respective end faces 26, 34 and 37 of each core portion 13. Parallel grooves 100 interposed between the core slots 99 are machined inwardly of surface 107 in a well known manner. These grooves 100 serve as the previously mentioned shield slots.

The plurality of magnetic core portions 10 and 13 with respective windings 17, 112 and 18, 114 provided thereon as described previously with reference to FIG. 2 is respectively placed in grooves 98, 99 in precise alignment and rigidly held in place within the respective side pieces 106, 108, for example, by epoxy, as it is well known in the art. The respective end faces 24, 32 and 35 of core portions 10 and end faces 26, 34 and 37 of core portions 13 are precisely lapped and polished, respectively, to form a transducing gap plane 21, utilizing techniques well known in the art. Nonmagnetic transducing gap material, for example, mica, is placed on the lapped and polished transducing gap surfaces of at least one half assembly as well known in the art. Alternatively, the transducing gap may be formed by vacuum deposition of $SiO_2$ or by sputtering of glass, on the pole faces 24, 26, while the respective end faces 32, 34, 35, 37 of the back core legs 28, 54, 15, 16 are suitably masked to prevent deposition of the transducing gap material thereon as it is known in the art. The resulting thickness of the transducing gap material 20 between abutting end faces 24, 26 of poles 48, 52 is selected depending on the requirements of the particular application.

As noted before, in the preferred embodiment of FIGS. 3 to 6, the intermediate leg 28, 54 of each channel is utilized for recording and rear leg 15, 16 for playback. Accordingly, each coil 112, 114 represents one-half of a recording winding and each coil 17, 18 one-half of a reproducing winding. It will be understood however that in some applications only one half of the respective windings may be utilized. The terminals of the respective coils 17, 18, 112, and 114 are connected to respective terminal boards (not shown) attached to each half assembly 59, 60 in a manner well known in the art. After the half assemblies are brought together with the core portions 10, 13 abutting at the transducing gap plane 21 as it will be described below, coils 112 and 114 are connected together to form a recording winding and analogously coils 17 and 18 are connected together to form a playback winding by interconnecting corresponding coil terminals on the terminal boards in a known manner.

The corresponding half assemblies 59, 60 of the multichannel transducer are brought together with the corresponding core portions 10, 13 in juxtaposition, having the respective end faces 24, 26; 32, 34; and 35, 37 of each half assembly precisely aligned in a confronting relationship and having the respective shield slots 100 in precise registration. The thusly assembled half assemblies are clamped together, for example, by means of a suitable fixture, as well known in the art, and therefore not shown in the drawings.

Thereafter a suitable pressure is applied to the thusly obtained assembly 58 thus allowing the rear leg portions 15, 16 to flex as it has been described in the U.S. Pat. No. 4,293,884.

While half assemblies 59, 60 are being held and pressed together as above described, interchannel magnetic shields 126 preferably of the shape shown in FIG. 6 are inserted in the precisely matched shield slots 100 as it is shown in FIG. 3. The shields 126 are preferably made of mumetal or mumetal-copper laminations. The front portion 65 of shield 126 is rounded to correspond to the shape of the front portion of the transducer assembly 58 containing the gap 20. The dimension of the shields 126 is such that the front-to-back dimension, that is the dimension from front portion 65 to back portion 68 exceeds a corresponding dimension of the assembled core portions 10, 13. Similarly the dimension of shields 126 between opposite lateral portions 66, 67 exceeds the lateral dimension of cores 10, 13 as best seen from the difference between the respective depths of the core slots 99 and shield slots 100 in FIG. 5.

While held under pressure, the multichannel transducer assembly is bonded with epoxy and cured, as it is well known in the art. For example, a bonding material of the type Epon Resin 815 manufactured by Shell Corporation may be utilized, mixed with U-Hardener in ratio 5:1 and glass beads between 25% and 50% of the total volume may be added thereto as a filler, as it is known in the art. Bonding conditions are directed by the manufacturer.

After the bonding process the outside pressure applied by the previously mentioned known fixture is removed. However, in the resulting transducer structure the corresponding magnetic core portions 10, 13 remain pressed together by the surrounding cured epoxy compound with the rear legs flexed as described before.

After the epoxy has been cured the multichannel transducer of the invention may be contoured to obtain a desired transducer-to-magnetic medium interface as it is well known in the art.

It follows from the above disclosure that the reproducing coils 17, 18 of FIG. 4 are located substantially further away from both the opposite sides 66, 67 as well as from the back portion 68 of interchannel shields 126 when comparing to the prior art multileg transducer of FIG. 1. Consequently any leakage flux generated in an adjacent channel is sharply reduced from being induced into coils 17, 18 when comparing to the prior art transducer. It will be understood that the latter advantage also applies to reduction of any leakage flux which may be generated in coils 17, 18 of FIG. 4 and which is induced in an adjacent channel. However, such leakage flux is further minimized in the preferred embodiment of the invention by the improved electromagnetic coupling between the coil and underlying core as described above.

The multichannel transducer of the preferred embodiment may be utilized either for recording or for playback, as previously mentioned. For example, when selected or all the channels of the multichannel transducer 58 are utilized for recording, the respective playback windings 17, 18 of these channels are shorted to prevent an appreciable magnetic flux to flow through the playback leg 15, 16. Similarly, when selected or all the channels of the transducer assembly 58 are utilized for playback, the recording coils 112, 114 of these channels are shorted to prevent appreciable magnetic flux to flow through the recording legs 28, 54, as for example described in U.S. Pat. No. 3,881,194.

It follows from the foregoing description that the present invention provides a significantly improved multichannel multileg magnetic transducer and method of manufacturing thereof. In one embodiment of the invention a 4 db to 6 db improvement in channel-to-channel crosstalk over prior art transducers was measured. In the latter example the crosstalk was measured in the reproducing mode of one transducer channel while an adjacent channel was operating in recording mode. It is believed that the latter improvment is largely due to the angled position of the reproducing leg and associated winding with respect to the recording leg of an adjacent channel. By the latter feature of the invention more distant location of the reproducing coil from the edges of the interchannel shields is obtained. It is further believed that the tight fit of the reproduce coil around the underlying portion of the core also contributes to the crosstalk reduction, since both latter features effectivley reduce leakage flux from or into a reproduce channel into or from adjacent closely spaced channels, respectively. A similar improvement in crosstalk reduction between two adjacent channels which are in reproducing mode can be expected.

It may be also seen from the comparison between the prior art transducer and that of the invention shown in FIG. 4 that the length of the reproducing magnetic core portion which does not contain the reproducing coil is substantially reduced in the transducer of the invention while the overall coil length is extended. At the same time the improved core structure is closer to a toroidal shape while the overall length of the reproduce portion of the core is reduced. Consequently the reluctance of the reproduce flux path is reduced and overall reproduce efficiency is improved.

FIG. 7 shows an alternative embodiment of a multiple leg magnetic core structure in accordance with the invention. The intermediate and rear leg portions 34, 16 of core 80 are similar to the above-described core 13 of FIG. 2. However, the pole 83 of FIG. 7 is different from pole 52 of FIG. 2 since it has a shape generally referred to as "hammerhead." The side piece 81 is also different from the previously described side piece 108 since it is notched at 82 to accomodate the hammerhead shaped pole 83. The other portions of core 80 are similar to that of core 13 and therefore will not be repeated herein. Coils (not shown in FIG. 7) similar to 18 and 114 of FIGS. 2 and 4 are received by the respective legs 16, 54 of core 80 in accordance with the above description of the preferred embodiment of the invention.

In the preferred embodiment of FIGS. 2 to 6 the magnetic transducer core 10, 13 is shown as having a reproducing leg 15, 16 of a smaller cross section with respect to the recording leg 28, 54. The latter feature provides a higher recording efficiency in the recording mode since leg 15, 16 represents a greater reluctance to the recording flux and consequently, it is "decoupled" more efficiently during recording. The trade-off, however, is less efficiency in the playback mode. However, it will be understood from the foregoing disclosure that the improvements in efficiency provided by the present invention partially compensate for the above loss.

While preferred embodiments of the invention have been described above and are illustrated in the drawings, it will be appreciated that a number of alternatives and modifications may be made which will fall within the scope of the appended claims.

What is claimed is:

1. A multichannel magnetic transducer assembly having at least two closely spaced parallel transducing channels, each channel having a magnetic core with poles defining a transducing gap and a multiple leg back core contiguous with the poles, each leg providing a separate flux path, comprising in combination:
    (a) each channel having two separate corresponding core portions made of a generally flexible magnetic material, each core portion comprising a magnetic pole, at least one intermediate leg portion, and a rear leg portion, said respective leg portions being contiguous with the pole, said magnetic pole and leg portions having smoothly lapped end faces defining a transducing gap plane;
    (b) said rear leg portion of each core portion extending at an acute angle with respect to said intermediate leg portion and converging towards said transducing gap plane;
    (c) respective transducing coils provided on at least one intermediate and one rear leg portion of said corresponding core portions of each channel; and
    (d) said corresponding core portions of each channel being assembled with said end faces of said corresponding intermediate and rear leg portions abutting and with said magnetic poles defining a transducing gap therebetween.

2. The multichannel transducer assembly of claim 1 wherein said acute angle of said rear leg portion is selected to provide a clearance from said intermediate leg portion necessary for winding a transducing coil directly on said rear leg portion.

3. The multichannel transducer assembly of claim 2 wherein said transducing coil provided on said rear leg portion is tightly wound directly around said rear leg portion.

4. The multichannel transducer assembly of claim 1 wherein each magnetic core portion comprises one intermediate leg portion for receiving a low impedance recording coil and wherein said rear leg portion is provided to receive a high impedance reproducing coil.

5. The multichannel magnetic transducer assembly of claim 4 wherein said acute angle of said rear leg portion is selected to provide a clearance from said intermediate leg portion necessary for winding a transducing coil directly on said rear leg portion, and wherein the windings of said high impedance reproducing coil are tightly wound directly around said rear leg portion.

6. The multichannel magnetic transducer assembly of claim 1 further comprising interchannel magnetic shields interposed between said transducing channels, each shield extending beyond opposite lateral portions and rear portions of said assembled core portions, respectively.

7. A multichannel magnetic transducer assembly having a plurality of closely spaced parallel transducing channels, each channel comprising a magnetic core with poles defining a transducing gap and a multiple leg back core contiguous with the poles, each leg providing a separate flux path, comprising in combination:
    (a) each channel having two separate corresponding core portions made of a generally flexible magnetic material, each core portion comprising a magnetic pole, an intermediate leg portion and a rear leg portion, both leg portions being contiguous with the magnetic pole, said magnetic pole and leg portions having smoothly lapped end faces defining a transducing gap plane;

(b) said rear leg portion of each core portion extending at an acute angle with respect to said intermediate leg portion and converging towards said transducing gap plane;
(c) a low impedance recording coil provided at least on one said intermediate leg portion of each two corresponding core portions and a high impedance reproducing coil provided at least on one said rear leg portion of each two corresponding core portions; and
(d) a nonmagnetic core holder having two corresponding side pieces, each supporting a plurality of said magnetic core portions at said magnetic pole and intermediate leg portions, said side pieces being assembled with said end faces of said intermediate and rear leg portions of each corresponding core portion abutting and with said magnetic poles defining a transducing gap therebetween.

8. The multichannel magnetic tranducer assembly of claim 7 further comprising interchannel magnetic shields interposed between said transducing channels, each shield extending beyond opposite lateral portions and rear portions of said assembled core portions, respectively.

9. A multichannel magnetic transducer assembly having a plurality of closely spaced parallel transducing channels, each channel comprising a magnetic core with poles defining a transducing gap and a multiple leg back core contiguous with the poles, each leg providing a separate flux path, comprising in combination:
(a) each channel having two separate corresponding core portions made of a generally flexible magnetic material, each core portion comprising a magnetic pole, an intermediate leg portion and a rear leg portion, both leg portions being contiguous with the magnetic pole, said magnetic pole and leg portions having smoothly lapped end faces defining a transducing gap plane;
(b) said rear leg portion of each core portion extending at an acute angle with respect to said intermediate leg portion and converging towards said transducing gap plane, said acute angle being selected to provide a clearance from said intermediate leg portion necessary for winding a transducing coil directly on said rear leg portion;
(c) a low impedance recording coil provided at least on one said intermediate leg portion of each two corresponding core portions and a high impedance reproducing coil provided at least on one said rear leg portion of each two corresponding core portions, and wherein the windings of said reproducing coil are tightly wound directly around said rear leg portion; and
(d) a nonmagnetic core holder having two corresponding side pieces, each supporting a plurality of said magnetic core portions at said magnetic pole and intermediate leg portions, said side pieces being assembled with said end faces of said intermediate and rear leg portions of each corresponding core portion abutting and with said magnetic poles defining a transducing gap therebetween.

10. The multichannel magnetic transducer assembly of claim 9 further comprising interchannel magnetic shields interposed between said transducing channels, each shield extending beyond opposite lateral portions and rear portions of said assembled core portions, respectively.

11. A method of making a multichannel magnetic transducer assembly having at least two closely spaced parallel transducing channels, each channel having a magnetic core with poles defining a transducing gap and a multiple leg back core contiguous with the poles, each leg providing a separate flux path, comprising the steps of:
(a) forming a plurality of separate corresponding core portions of a generally flexible magnetic material while providing on each core portion a magnetic pole, and contiguously therewith at least one intermediate leg portion and a rear leg portion, respectively, each leg portion providing a separate flux path and said rear leg portion extending at an acute angle with respect to said intermediate leg portion while converging towards said transducing gap plane;
(b) forming smoothly lapped end faces defining a transducing gap plane on said magnetic pole and intermediate and rear leg portions of each said magnetic core portion, respectively;
(c) providing a first transducing coil on at least one intermediate leg portion and a second transducing coil on at least one rear leg portion of said corresponding core portions of each channel, respectively; and
(d) assembling for each channel two said corresponding core portions with said end faces of the intermediate and rear leg portions abutting and with said magnetic poles defining a transducing gap therebetween.

12. The method of claim 11 wherein the step of forming said separate core portions comprises selecting said acute angle such that a sufficient clearance is obtained between said rear leg portion and intermediate leg portion necessary for winding a second transducing coil directly on said rear leg portion.

13. The method of claim 12 wherein the step of providing said transducing coils comprises tightly winding said second coil directly around said rear leg portion.

14. The method of claim 13 wherein the step of winding said second coil around said rear leg portion is provided prior to providing a first coil on said intermediate leg portion of the same magnetic core portion.

15. The method of claim 11 wherein the step of forming said separate core portions comprises forming one intermediate leg portion on each said core portion; and wherein
the step of providing said first and second transducing coils comprises providing a low impedance recording coil on said intermediate leg portion and providing a high impedance reproducing coil on said rear leg portion, respectively.

16. The method of claim 15 wherein the step of forming said separate core portions further comprises selecting said acute angle such that a sufficient clearance is obtained between said rear leg portion and intermediate leg portion necessary for winding a reproducing coil directly on said rear leg portion, and wherein said reproducing coil is tightly wound directly around said rear leg portion, prior to providing a low impedance recording coil on the intermediate leg portion of the same magnetic core portion.

17. The method of claim 11 further comprising the steps of:
providing a plurality of interchannel magnetic shields, said shields exceeding the size of said asssembled magnetic cores at opposite lateral portions and rear portions thereof; and interposing said interchannel magnetic shields between said transducing channels.

18. A method of making a multichannel magnetic transducer assembly having at least two closely spaced parallel transducing channels, each channel having a magnetic core with poles defining a transducing gap and a multiple leg back core contiguous with the poles, each leg providing a separate flux path, comprising the steps of:

(a) forming a plurality of separate corresponding core portions of a generally flexible magnetic material while providing on each core portion a magnetic pole, and providing contiguously therewith an intermediate leg portion and a rear leg portion, respectively, each leg portion providing a separate flux path and said rear leg portion extending at an acute angle with respect to said intermediate leg portion while converging towards said transducing gap plane;

(b) forming smoothly lapped end faces defining a transducing gap plane on said magnetic pole and intermediate and rear leg portions of each said magnetic core portion, respectively;

(c) providing a low impedance recording coil at least on one intermediate leg portion of each two corresponding core portions and providing a high impedance reproducing coil at least on one said rear leg portion of each two corresponding core portions; and (d) providing a nonmagnetic holder having two corresponding side pieces for supporting said plurality of said magnetic core portions at said pole and intermediate leg portions and assembling said side pieces in such a way that said end faces of said intermediate and rear leg portions of each corresponding core portion abut and said magnetic poles define a transducing gap therebetween.

19. The method of claim 18 further comprising the steps of:

providing a plurality of interchannel magnetic shields, said shields exceeding the size of said assembled magnetic cores at opposite lateral portions and rear portions thereof; and interposing said interchannel magnetic shields between said transducing channels.

20. A method of making a multichannel magnetic transducer assembly having at least two closely spaced parallel transducing channels, each channel having a magnetic core with poles defining a transducing gap and a multiple leg back core contiguous with the poles, each leg providing a separate flux path, comprising the steps of:

(a) forming a plurality of separate corresponding core portions of a generally flexible magnetic material while providing on each core portion a magnetic pole, and providing contiguously therewith an intermediate leg portion and a rear leg portion, respectively, each leg portion providing a separate flux path and said rear leg portion extending at an acute angle with respect to said intermediate leg portion while converging towards said transducing gap plane, said acute angle being selected such that sufficient clearance is obtained between said rear leg portion and intermediate leg portion necessary for winding a transducing coil directly on said rear leg portion;

(b) forming smoothly lapped end faces defining a transducing gap plane on said magnetic pole and intermediate and rear leg portions, of each said magnetic core portion, respectively;

(c) providing a low impedance recording coil at least on one intermediate leg portion of each two corresponding core portions and winding tightly a high impedance reproducing coil directly around at least one said rear leg portion of each two corresponding core portions, respectively; and (d) providing a nonmagnetic holder having two corresponding side pieces for supporting said plurality of said magnetic core portions at said pole and intermediate leg portion and assembling said side pieces in such a way that said end faces of said intermediate and rear leg portions of each corresponding core portion abut and said magnetic poles define a transducing gap therebetween.

21. The method of claim 20 wherein the step of winding said high impedance reproducing coil around said rear leg portion is provided prior to the step of providing a low impedance recording coil on said intermediate leg portion of the same magnetic core portion.

22. The method of claim 20 further comprising the steps of:

providing a plurality of interchannel magnetic shields, said shields exceeding the size of said assembled magnetic cores at opposite lateral portions and rear portions thereof; and interposing said interchannel magnetic shields between said transducing channels.

* * * * *